United States Patent
Wohl, Jr. et al.

(10) Patent No.: US 8,987,632 B2
(45) Date of Patent: Mar. 24, 2015

(54) MODIFICATION OF SURFACE ENERGY VIA DIRECT LASER ABLATIVE SURFACE PATTERNING

(75) Inventors: Christopher J. Wohl, Jr., Portsmouth, VA (US); Marcus A. Belcher, Newport News, VA (US); John W. Connell, Yorktown, VA (US); John W. Hopkins, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 889 days.

(21) Appl. No.: 12/894,279

(22) Filed: Sep. 30, 2010

(65) Prior Publication Data
US 2011/0086204 A1 Apr. 14, 2011

Related U.S. Application Data

(60) Provisional application No. 61/250,190, filed on Oct. 9, 2009.

(51) Int. Cl.
*B23K 26/36* (2014.01)
*B32B 38/10* (2006.01)
(Continued)

(52) U.S. Cl.
CPC ............. *B23K 26/0084* (2013.01); *B32B 38/10* (2013.01); *B23K 26/0081* (2013.01); *B23K 26/4005* (2013.01); *B23K 26/4025* (2013.01);
(Continued)

(58) Field of Classification Search
USPC ........... 219/121.61, 121.68, 121.69; 428/141, 428/687, 609, 612; 156/257; 264/400
See application file for complete search history.

(56) References Cited

U.S. PATENT DOCUMENTS 3,814,895 A * 6/1974 Fredriksen ............... 219/121.68
4,543,464 A * 9/1985 Takeuchi ................. 219/121.68
(Continued)

FOREIGN PATENT DOCUMENTS

DE         20114878 U1 *  3/2002
JP      2003-268566 A  *  9/2003
(Continued)

OTHER PUBLICATIONS

J. Lawrence and L. Li, "Modification of the wettability chracteristics of polymethyl methacrylate (PMMA) by means of CO2, Nd: YAG, excimer and high power diode laser radiation", Materials Science and Engineering: A, vol. 303, Issues 1-2, May 15, 2001, pp. 142-149.
(Continued)

*Primary Examiner* — Geoffrey S Evans
(74) *Attorney, Agent, or Firm* — Jennifer L. Riley; Thomas K. McBride; Helen M. Galus

(57) ABSTRACT

Surface energy of a substrate is changed without the need for any template, mask, or additional coating medium applied to the substrate. At least one beam of energy directly ablates a substrate surface to form a predefined topographical pattern at the surface. Each beam of energy has a width of approximately 25 micrometers and an energy of approximately 1-500 microJoules. Features in the topographical pattern have a width of approximately 1-500 micrometers and a height of approximately 1.4-100 micrometers.

19 Claims, 1 Drawing Sheet

(51) Int. Cl.
  *B23K 26/00* (2014.01)
  *B23K 26/40* (2014.01)
(52) U.S. Cl.
  CPC ......... *B23K 26/4085* (2013.01); *B23K 26/0009* (2013.01); *B23K 26/0015* (2013.01); *B23K 26/0018* (2013.01); *B23K 26/0036* (2013.01); *B23K 26/0045* (2013.01); *B23K 26/0048* (2013.01)
  USPC ..................................... 219/121.69; 156/257

(56) References Cited

U.S. PATENT DOCUMENTS

| | | | |
|---|---|---|---|
| 4,898,650 A | | 2/1990 | Wu et al. |
| 4,908,494 A * | | 3/1990 | Faiz et al. ................. 219/121.72 |
| 5,373,140 A | | 12/1994 | Nagy et al. |
| 5,435,876 A * | | 7/1995 | Alfaro et al. ................... 156/257 |
| 5,473,138 A * | | 12/1995 | Singh et al. .............. 219/121.69 |
| 5,500,505 A | | 3/1996 | Jones ....................... 219/121.72 |
| 5,558,789 A * | | 9/1996 | Singh ........................ 219/121.69 |
| 5,635,089 A * | | 6/1997 | Singh et al. .............. 219/121.69 |
| 5,688,564 A | | 11/1997 | Coddet et al. |
| 5,841,100 A * | | 11/1998 | Minhas .................... 219/121.69 |
| 6,056,827 A | | 5/2000 | Fukui et al. |
| 6,176,959 B1 * | | 1/2001 | Clarke ..................... 219/121.69 |
| 6,698,354 B2 * | | 3/2004 | Juffinger et al. ......... 219/121.76 |
| 6,976,585 B2 | | 12/2005 | Extrand |
| 7,258,731 B2 | | 8/2007 | D'Urso et al. |
| 7,419,615 B2 | | 9/2008 | Strauss |
| 2001/0011545 A1 | | 8/2001 | Thompson et al. |
| 2002/0134770 A1 | | 9/2002 | Freiwald et al. |
| 2002/0149136 A1 * | | 10/2002 | Baird et al. .................... 264/400 |
| 2002/0170892 A1 | | 11/2002 | Lee et al. |
| 2002/0190435 A1 * | | 12/2002 | O'Brien et al. .......... 219/121.67 |
| 2004/0124184 A1 * | | 7/2004 | An et al. ................... 219/121.66 |
| 2004/0137699 A1 * | | 7/2004 | Kurosawa ..................... 438/460 |
| 2004/0206731 A1 | | 10/2004 | Song et al. |
| 2005/0223550 A1 * | | 10/2005 | Launay et al. ................... 29/825 |
| 2005/0236107 A1 * | | 10/2005 | Doi et al. ....................... 438/464 |
| 2006/0008627 A1 * | | 1/2006 | Nyholm et al. ................ 428/209 |
| 2006/0079062 A1 * | | 4/2006 | Mazur et al. ................... 438/308 |
| 2006/0108330 A1 | | 5/2006 | Lee et al. |
| 2006/0147634 A1 | | 7/2006 | Strauss |
| 2007/0141306 A1 | | 6/2007 | Kasai et al. |
| 2007/0166464 A1 | | 7/2007 | Acatay et al. |
| 2007/0193985 A1 | | 8/2007 | Howard et al. |
| 2007/0224391 A1 | | 9/2007 | Krupenkin et al. |
| 2007/0272555 A1 * | | 11/2007 | Baird ............................ 204/569 |
| 2008/0138582 A1 * | | 6/2008 | Bhandari et al. ................ 216/11 |
| 2008/0160295 A1 * | | 7/2008 | Lappalainen et al. ........ 264/400 |
| 2008/0199657 A1 | | 8/2008 | Capron et al. |
| 2008/0213612 A1 * | | 9/2008 | Starikov et al. .......... 219/121.69 |
| 2008/0216300 A1 * | | 9/2008 | Anderson et al. .......... 29/402.07 |
| 2008/0217180 A1 | | 9/2008 | Doye et al. |
| 2009/0008372 A1 | | 1/2009 | Lee et al. |
| 2009/0011222 A1 | | 1/2009 | Xiu et al. |
| 2009/0020137 A1 | | 1/2009 | Osawa |
| 2009/0038637 A1 | | 2/2009 | LeClaire et al. |
| 2009/0191693 A1 * | | 7/2009 | Iizuka ........................... 438/463 |
| 2009/0227089 A1 * | | 9/2009 | Plaut et al. .................... 438/464 |
| 2010/0028604 A1 * | | 2/2010 | Bhushan et al. ............... 427/258 |
| 2010/0040833 A1 * | | 2/2010 | Quartarone ................... 428/156 |
| 2010/0316845 A1 * | | 12/2010 | Rule et al. ................... 156/272.2 |
| 2011/0287217 A1 * | | 11/2011 | Mazumder et al. ........... 264/400 |

FOREIGN PATENT DOCUMENTS

| | | | |
|---|---|---|---|
| KR | 1020090012567 | * | 2/2009 |
| WO | WO 99/37830 | | 7/1999 |
| WO | WO 00/14297 | | 3/2000 |

OTHER PUBLICATIONS

J.S. Rossier, P. Bercier, A. Schwarz, S. Loridant, and H. H. Girault, "Topography, Crystallinity and Wettability of Photoablated PET Surfaces", Langmuir, Jun. 25, 1999, 15 (15), pp. 5173-5178.

Tommaso Baldacchini, James E. Carey, Ming Zhou, and Eric Mazur, "Superhydrophobic Surfaces Prepared by Microstructuring of Silicon Using a Femtosecond Laser", Langmuir, Apr. 19, 2006, 22, pp. 4917-4919.

Anne-Marier Kietzig, Savvas G. Hatzikiriakos, and Peter Englezos, "Patterned Superhydrophobic Metallic Surfaces", Langmuir, Mar. 6, 2009, 25, (8), pp. 4821-4827.

Miehua Jin, Xinjian Feng, Jinming Xi, Jin Zhai, Kilwon Cho, Lin Feng, and Lei Jiang, "Super-Hydrophobic PDMS Surface with Ultra-Low Adhesive Force", Macromolecular Rapid Communications, Nov. 3, 2005, vol. 26, Issue 22, pp. 1805-1809.

H. Schulz, M. Leonhardt, H. -J. Scheibe, B. Schultrich, "Ultra hydrophobic wetting behaviour of amorphous carbon films", Surface and Coatings Technology, Oct. 1, 2005, vol. 200, Issues 1-4, pp. 1123-1126.

J. Hu, G. Liu, Z.J. Li, L.C. Kong, "Improvement in the corrosion resistance of Al18B4O33w/2024Al composite by laser surface treatment", Applied Surface Science, Mar. 15, 2007, vol. 253, Issue 10, pp. 4524-4530.

Q. Benard, M. Fois, M. Grisel, P. Grisel, P. Laurens, and F. Joubert, "Influence of the Polymer Surface Layer on the Adhesion of Polymer Matrix Composites", Journal of Thermoplastic Composite Materials, Jan. 2009, vol. 22, 1: pp. 51-61.

* cited by examiner

MODIFICATION OF SURFACE ENERGY VIA DIRECT LASER ABLATIVE SURFACE PATTERNING

Pursuant to 35 U.S.C. §119, the benefit of priority from provisional application 61/250,190, with a filing date of Oct. 9, 2009, is claimed for this non-provisional application, and the contents of which are incorporated herein by reference thereto.

ORIGIN OF THE INVENTION

The invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to methods for altering the surface energy of a material. More specifically, the invention is a method of modifying the surface energy of a substrate material using laser ablation where the method does not require the use of any template, mask, coating, or post-ablation processing.

2. Description of the Related Art

Interfacial interactions are governed by the surface energy of the contacting materials. The proclivity for favorable (adhesive or wetting) or unfavorable (adhesive or non-wetting) interactions will depend on the relative magnitude of these surface energies. As a result, the ability to controllably alter a material's surface energy is of great significance. Differences in the surface energy of materials can often be observed via water contact angle values.

Surface chemistry and topography contribute to a material's surface energy. Chemical functionalities present on a material's surface alter surface energy through intermolecular forces (e.g., dispersion forces, dipole-dipole interactions, polarizability, etc.). Topographies impact surface energy by altering the contact line between two surfaces. For liquid droplets on a solid surface, this is referred to as the three-phase contact line. The continuity of the three-phase contact line dramatically influences the wetting behavior and surface energy of the solid substrate. For a rough surface or one with a high density of topographical features, the contact line can be continuous or discontinuous. If the contact line is continuous, the surface is said to exhibit wetting in the Wenzel state where the liquid has penetrated into the interstices of the topographical features. This results in a larger contact area between the liquid and the surface than would be observed on a flat surface of the same dimensions and often leads to adhesion promotion. For discontinuous contact lines, the liquid has not penetrated the surface topography interstices resulting in a reduced contact area relative to a flat surface and a Cassie-Baxter wetting state. Discontinuous contact lines often correlate with surfaces that exhibit adhesive interactions and superhydrophobicity, where water contact angles exceed 150°.

Surface preparation for adhesion promotion utilizes methods to increase the surface energy of a material either chemically or topographically. State-of-the art surface preparation for metal adherends typically involves grit-blasting followed by multiple chemical oxidative treatments and subsequent application of a primer or coupling agent. The use of chemical surface preparation techniques for metallic substrates requires large volumes of environmentally toxic materials. For the surface preparation of reinforced composite materials grit-blasting, manual abrasion, and peel ply treatments are commonly employed. All of these surface preparation techniques are not ideal in terms of adhesively bonded structures because of variations in their application (i.e., there can be dissimilarities across surfaces because of different operators, operator error, or other inconsistencies inherent with these techniques). Similarly, these techniques can alter the bonding interface due to debris and introduction of surface curvature. Thus, an environmentally benign, rapid, scalable, precise, and highly reproducible surface preparation technique for the purposes of adhesion promotion would mitigate many of these shortcomings and be of great utility.

Surface preparation for adhesion promotion requires a reduction in the surface energy of a material. Once again, this can be achieved both chemically and topographically. For a smooth surface, water contact angle values>120° cannot be achieved solely through surface chemical modification. For the generation of superhydrophobic surfaces, which are akin to low surface energy materials, topographical modification of the material is required. Superhydrophic surfaces are known to mitigate particulate adhesion, which not only changes the appearance of an exposed surface, but also can impair or reduce the efficacy of the impacted structure. Exterior building wall fouling as a result of particulate accumulation often results in acceleration of degradation due to the introduction of organic matter and a viable matrix for mold and fungal growth. Similarly, solar cell efficiency rapidly diminishes as a result of surface contamination by particulate adhesion. Frictional wear also increases considerably due to the presence of particulate matter. Therefore, identification of a method to reduce the propensity for particulate adhesion by lowering surface energy via topographical modification would be useful to a broad range of materials applications.

The current state-of-the-art surface treatment for aluminum metal bonding for most applications is phosphoric acid anodization, chromic acid anodization, or chromic acid etching. The preferred surface treatment method for both production and repair of titanium, stainless steel, and nickel substrates is a wet chemistry process called sol-gel. Although great progress has been made over the past few decades in improving the performance and durability of bonded metal structures, there remains much room for improvement. Furthermore, one of the greatest challenges facing the metal bonding industry today are the changing safety and environmental regulations that control the use of chemicals used to process bonded metal structures. There is a great need to minimize or eliminate the use of toxic chemicals and volatile organic solvents.

The current state-of-the-art for preparing composite surfaces for bonding uses abrasive techniques such as grit-blasting, surface roughening (manual abrasion), and peel plies. These methods lack precision and reproducibility thereby making quality control difficult. Surface preparation methods for composites are currently process controlled and no viable methods exist to assess whether a surface is adequately prepared. Also, the reliability of peel ply methods needs additional improvement from a reproducibility and contamination viewpoint. While grit-blasting of composite surfaces is widely used, the understanding of the effects of microcracking and grit embedment still need to be understood within the context of the durability of the bond as it ages. From an environmental and health perspective, the containment of the grit blast media and exposure of workers to grit dust are also issues.

A technique for generating patterned surface topographies that includes laser ablation was reported by Jin et al. in "Super-Hydrophobic PDMS Surface with Ultra-Low Adhesive Force," Macromolecular Rapid Communications, 26, 1805-1809 (2005). However, the technique described therein requires laser ablation of a support substrate utilizing a mask or template to impart the desired surface pattern. The ablation process also results in deposition of ablated debris on the treated surface. As a result, this ablated material forms topographical features on the nanometer scale that render the material superhydrophobic. A further example of laser ablation patterning was reported by Schulz et al. in "Ultra Hydrophobic Wetting Behavior of Amorphous Carbon Film," Surface and Coatings Technology, 200, 1123-1126 (2005). Surface energy reduction described therein requires the use of both a laser and an arc plasma generating device. Additionally, the surfaces were rendered superhydrophobic only after the addition of an undisclosed hydrophobic film.

SUMMARY OF THE INVENTION

Accordingly, it is an object of the present invention to provide a simple and environmentally-safe method of modifying the surface energy of materials for the purposes of adhesion or abhesion promotion.

Other objects and advantages of the present invention will become more obvious hereinafter in the specification and drawings.

In accordance with the present invention, a method of changing the surface energy of a substrate without the need of any template, mask, or additional coating medium is provided. A completely uncovered surface of a substrate is directly ablated using at least one beam of energy to form a predefined topographical pattern at the surface. Each beam of energy has a width of approximately 25 micrometers and an energy of approximately 1-500 microJoules. Features in the topographical pattern have a width of approximately 1-500 micrometers and a height of approximately 1.4-100 micrometers.

DETAILED DESCRIPTION OF THE INVENTION

Figure 1:
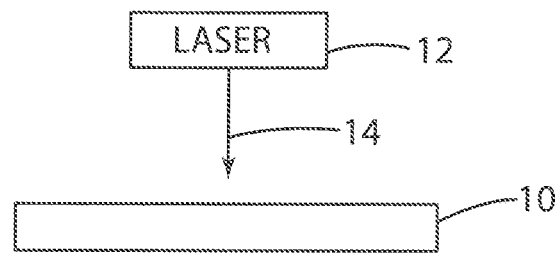
FIG. 1 is a schematic view of a laser ablation set-up in accordance with the present invention.

The present invention pertains to a laser ablative method to controllably alter the surface energy of a material via direct topographical modification using specific geometric patterns. The word "direct" as used herein is used to describe modification of a substrate without the need or use of any template, mask, or additional coating medium being applied to the surface of the substrate. More specifically, the present invention precisely controls laser ablation parameters including but not limited to beam size, laser power, laser frequency, scan speed, and number of pattern iterations. This enables the generation of topographical features that influence the surface energy of the material, which in turn control adhesive and abhesive properties. Since laser ablation is a material dependent process, laser ablation parameters requisite for introduction of the desired material property (surface energy) will vary depending on the substrate utilized. This laser ablative method is useful in a variety of applications including but not limited to replacing of Pasa-Jell or other chemical treatments for titanium bonding, replacing of peel-ply treatments for carbon-fiber reinforced composite bonding, generating coatings or surfaces for anti-icing, de-icing, and anti-insect adhesion on aerospace vehicles, generating low friction coatings or surfaces, generating light-absorbing coatings or surfaces, and generating self-cleaning coatings or surfaces.

This laser ablative method can be performed on metals, metal alloys, ceramics, polymers, and fiber reinforced metal, polymer, or ceramic composites or combinations thereof. Preferred materials include titanium and aluminum substrates, carbon fiber reinforced composite materials, and polymeric materials. The method is applicable to any polymeric material. Preferred materials include but are not limited to commodity or engineering plastics including but not limited to polycarbonate, polyacrylate, polyacrylonitrile, polyester, polyamide, polystyrene (including high impact strength polystyrene), polyurethane, polyurea, polyurethaneurea, epoxy resins, poly(acrylonitrile butadiene styrene), polyimide, polyarylate, poly(arylene ether), polyethylene, polypropylene, polyphenylene, polyphenylene sulfide, poly(vinyl ester), polyether ether ketone, polyvinyl chloride, poly(vinyl alcohol), bismaleimide polymer, polyanhydride, liquid crystalline polymer, cellulose polymer, fluorinated polymers, or any combination thereof. The method is also applicable to copolymers of the aforementioned polymeric materials and preferred copolymers are copoly(imide siloxane)s, copoly (imide butadiene)s, copoly(imide butadiene acrylonitrile)s. Many of these polymers are available from multiple, well-known commercial suppliers.

The materials can be in a variety of forms such as foams, films, coatings, fibers, adhesives, molded or machined parts consisting of a single or multiple material compositions. The method can be used to modify surfaces during the original manufacture or to modify surfaces in the field as part of a remanufacturing or repair process.

A simplified view of the approach used in the present invention is illustrated in FIG. 1. In this method, a substrate 10 to be laser-ablation-patterned is positioned in reference to the irradiation source such as a laser 12 that transmits a beam of energy 14 towards substrate 10. For the purposes of demonstrating the invention described herein, a frequency tripled ($\lambda$=355 nm, 7 W) Nd:YAG laser was utilized in a pulsed mode. However, any source of laser irradiation of sufficient energy to supersede the ablation threshold of the substrate material can be envisioned including but not limited to a $CO_2$ laser source, an excimer laser source, a high power diode laser source, a Ti:Sapphire laser source, and different frequencies of a Nd:YAG laser source or a combination thereof. Although the Nd:YAG laser was operated in a pulsed mode, continuous wave laser irradiation can also be used to controllably alter the surface energy of an exposed material through topographical modification. For the purposes of pattern transcription, a galvanometrically driven beam scanner (not shown) was utilized to precisely and programmatically control the position and speed of the laser beam. Other embodiments for pattern transcription include but are not limited to programmatically-controlled movement of the substrate, manually-controlled movement of the laser, and manually-controlled movement of the substrate or any combination thereof.

Figure 2:
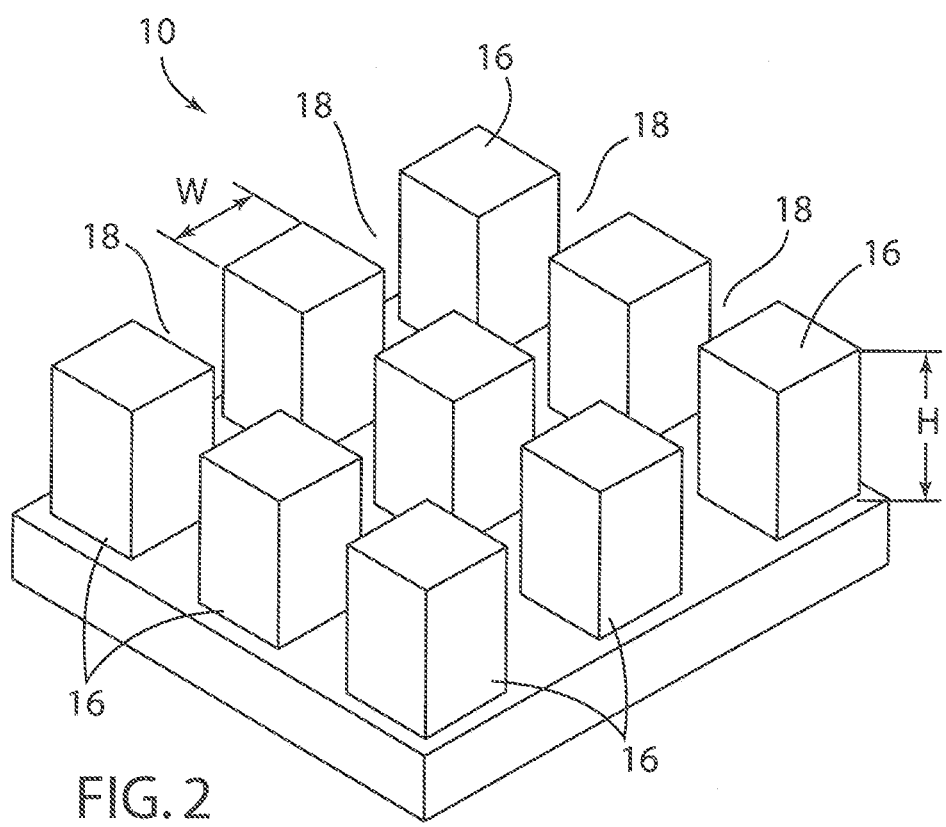
FIG. 2 is a perspective view of a substrate material illustrating a 0°/90° laser-ablated crosshatch pattern in accordance with an embodiment of the present invention.
Figure 3:
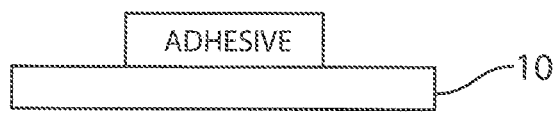
FIG. 3 is a schematic view of a substrate and adhesive in accordance with the present invention.

In general, a predefined pattern is transcribed on the substrate while controlling the beam size, laser power, laser frequency, scan speed, and number of pattern iterations. Preferred ablation patterns include 0°/90° crosshatch patterns, 0°/45° crosshatch patterns, linear array patterns, and orthogonal rotating linear arrays. Other patterns that can be envisioned include but are not limited to circular arrays, fractal geometries, triangular arrays, concentric patterns, diamond arrays, curved linear arrays, curved crosshatch patterns, and crosshatch patterns with other relative angles. FIG. 2 is an example of a 0°/90° crosshatch pattern in which substrate 10 has its surface ablated to yield rectangular pillars 16 of width "W" and height "H". Pillars 16 are separated by gaps 18 formed during laser ablation.

A variety of substrate materials were laser ablated in accordance with the method of the present invention. These examples are presented later herein. In some examples, laser ablation patterning resulted in the formation of adhesion promoting surfaces (i.e., surfaces with increased surface energy). Laser ablation patterning for adhesion promotion requires that the laser parameters be adjusted to transcribe topographical features within geometric constraints. The maximal spacing between ablation lines should be no greater than about 300 µm. Similarly, an ablation depth of about 10 µm or greater must be achieved. These surfaces will exhibit a water contact angle lower than the un-ablated surface and typically less than about 50° corresponding to surface energy values greater than about 49 milliJoules per meter squared (mJ/m$^2$) as calculated by water contact angle measurement.

In other examples, the use of laser ablation patterning resulted in low surface energy materials with abhesive properties. Laser ablation patterning for the lowering of surface energy and abhesion promotion also requires that the laser parameters be adjusted to transcribe topographical features within geometric constraints. The topographical features on surfaces engineered for abhesive applications should possess a minimal ablation depth of about 1.4 µm. Ablation depth maxima will depend on the spacing of topographical features, the dimensions of the features, and the rigidity of the ablated material. For highly rigid materials possessing a flexural modulus of at least about 1.5 GPa, there will be no ablation depth maximum. For materials with low rigidity possessing a modulus equal to or less than about 1.5 GPa, an ablation depth maximum would be the maximum depth that would enable maintenance of the orientation of the topographical features (i.e., the features would not persist in an orientation different than the one in which they were generated). The spacing and dimensions of the topographical features will be dependent on the ablation depth. In some embodiments it is preferred that the surface topographical features not be spaced much further apart than the magnitude of the feature dimension multiplied by the ablation depth. Typical properties exhibited by abhesion promoting laser ablation patterned surfaces include increased water contact angle values relative to the un-ablated surface and typically greater than about 90° resulting in surface energy values less than about 18.2 mJ/m$^2$. Similarly, for the purposes of generating superhydrophobic surfaces, the resultant geometry should generate a highly discontinuous three-phase contact line. These surfaces may exhibit contact angle hysteresis values (the difference in advancing and receding contact angles) less than about 30° and sliding angles (the angle at which the substrate is tilted to induce rolling of the incident water droplet) less than about 15°.

In some embodiments it may be desirable to have more than one laser treatment step. For example, an Nd:YAG laser may be used to produce a patterned surface. A secondary laser treatment, with the same or different laser, may be used to further treat the surface to create the desired surface patterns and properties. In other embodiments, it may be desirable to use multiple lasers to produce a surface pattern with hierarchical dimensional features (i.e., smaller features on top of larger features) as a means to generate desired surface properties.

Articles incorporating materials with surfaces modified by the laser ablation methods described herein include articles such as, but not limited to, titanium and aluminum bonding specimens enabling the replacement of Pasa-Jell or other chemical treatments, carbon-fiber reinforced composite bonding specimens enabling the replacement of peel-ply treatments, and articles requiring anti-icing, de-icing, and anti-insect adhesion, low friction surfaces, light absorbing and/or scattering surfaces, and self-cleaning surfaces. These articles could also be a component of a larger assembly including but not limited to terrestrial and aerospace vehicles, solar panel assemblies, black body detectors, microelectronic components and the fabrication process thereof, dust-resistant articles, and moisture uptake resistant materials.

In summary, the present invention discloses a method to controllably modify the surface energy of a material by generating topographical patterns via direct laser ablation. Depending on the laser parameters utilized, hydrophilic materials can be transformed into hydrophobic and superhydrophobic surfaces, or can be modified to exhibit increased hydrophilicity. Contrarily, hydrophobic materials can be modified to exhibit surface properties ranging from hydrophilic to superhydrophobic. The laser ablation patterning method is rapid, scalable, environmentally benign, precise, and can be performed directly on a wide variety of materials. The resultant articles of manufacture have surfaces that can be utilized for adhesive bonding, self-cleaning, particle adhesion mitigation, low friction surfaces, anti-icing, de-icing, and anti-insect adhesion applications, and light scattering devices such as black body instruments among other embodiments.

Prior to describing specific examples fabricated using the method of the present invention, the general parameter constraints associated with some embodiments of the present invention will be presented. In one embodiment of the present invention, ablation is performed using one (or more) beams of energy having a beam width of approximately 25 micrometers and an energy of approximately 1-500 microJoules. The resulting features can have a width of approximately 1-500 micrometers and a height of approximately 1.4-100 micrometers. In another embodiment of the present invention, ablation is performed using one (or more) beams of energy having a beam width of approximately 25 micrometers and an energy of approximately 1-200 microJoules. The resulting features can have a width of approximately 10-250 micrometers and a height of approximately 1.4-50 micrometers. In still another embodiment of the present invention, ablation is performed using one (or more) beams of energy having a beam width of approximately 25 micrometers and an energy of approximately 3-175 microJoules. The resulting features can have a width of approximately 15-100 micrometers and a height of approximately 10-30 micrometers.

EXAMPLES

Having generally described the invention, a more complete understanding thereof may be obtained by reference to the following examples that are provided for purposes of illustration only and do not limit the invention.

Example 1

Generation of Hydrophilic Titanium Ti-6Al-4V Surfaces

The surface of titanium alloy (Ti-6Al-4V) lap shear specimens was modified by either grit-blasting, laser ablation patterning, or grit-blasting followed by laser ablation patterning. For laser ablation patterning an Nd:YAG laser (=355 nm) with a beam size of 25 μm, operating at 6.3 W and 30 kHz (resulting in a pulse energy of 210 μJ) with a scan speed of 25.4 cm/s was used to transcribe a 0°/90° crosshatch pattern using a single transcription step. The pattern was transcribed in the surface by first etching parallel lines in one direction. Next, parallel lines were drawn over the same sample space with a perpendicular orientation to the first series of lines at the same line spacing. The line spacing between features for each surface ablation treatment is indicated in Table 1. This ablation pattern created a square pillar array with a pillar width of 220 μm and an average feature height of 20 μm. The surface energy was determined using water contact angle values (Table 1). The treated titanium surfaces were subsequently coated with a primer or coupling agent consisting of imide oligomers with phenylethynyl pendant functionalities end-capped with trimethoxysilane groups following a procedure described by Park et al. in "PolyimideSilica Hybrids Using Novel Phenylethynyl Imide Silanes as Coupling Agents for Surface-Treated Alloy," International Journal of Adhesion and Adhesives, 20, 457-465 (2000). These samples were then bonded as described in Park et al. and the apparent shear strength was determined according to ASTM D1002-05 (Table 1).

As seen in Table 1, laser ablation patterning resulted in a dramatic decrease in water contact angle, a dramatic increase in surface energy, and comparable, if not superior, apparent shear strength values relative to samples that were only grit-blasted. Thus, it is clear that the present invention affords a rapid, scalable, highly precise, reproducible method for surface energy modification for titanium.

TABLE 1

Characterization results for surface treatment of titanium Ti—6Al—4V lap shear specimens as described in Example 1.

| Surface Treatment | Line Spacing (μm) | Water Contact Angle (°) | Surface Energy (mJ/m²) | Apparent Shear Strength (MPa) |
|---|---|---|---|---|
| Pristine Surface | N/A | 74 | 29.6 | N/A |
| Grit-Blasted | N/A | 91 | 17.6 | 29.3 ± 0.9 |
| Laser Ablation Patterned | 102 | 2 | 72.7 | 30.2 ± 0.9 |
| Laser Ablation Patterned | 254 | 2 | 72.7 | 18.4 ± 0.6 |
| Laser Ablation Patterned | 406 | 2 | 72.7 | 15.5 ± 1.5 |
| Grit-Blasted and Laser Ablation Patterned | 254 | 2 | 72.7 | 29.6 ± 0.6 |

Example 2

Generation of a Hydrophilic Aluminum 6061 Surface

An aluminum coupon (Al 6061) was exposed to the same laser ablation conditions as described in Example 1 except the laser scan rate was 12.7 cm/s, and the line spacing for the crosshatch pattern was 25 μm. This ablation pattern created a square pillar array with pillar width of 22 μm on the treated surface with an average feature height of 18 μm. The surface energy was determined using water contact angle values. A pristine Al 6061 surface exhibited a water contact angle value of 98° corresponding to a surface energy of 13.5 mJ/m2. The laser ablation patterned surface exhibited a water contact angle of 2.0° corresponding to a surface energy of 72.7 mJ/m2.

Example 3

Generation of a Hydrophobic Aluminum 6061 Surface

An aluminum coupon (Al 6061) was modified by laser ablation patterning with an Nd:YAG laser (=355 nm) with a beam size of 25 m, operating at 6.3 W and 80 kHz (resulting in a pulse energy of 78.8 J) with a scan speed of 25.4 cm/s. A 0°/90° crosshatch pattern with a line spacing of 25 m was transcribed four times. This ablation pattern created a square pillar array with pillar widths of 22 m and an average feature height of 15 m. The surface energy was determined using water contact angle values. A pristine Al 6061 surface exhibited a water contact angle of 102° corresponding to a surface energy of 11.4 mJ/m². The laser ablation patterned surface exhibited a water contact angle of 108° corresponding to a surface energy of 8.7 mJ/m².

Example 4

Generation of Hydrophilic Carbon Fiber Reinforced Composite Surfaces

Carbon fiber reinforced composite specimens (16 plies of unidirectional Torayca P2302-19 prepreg, a T800H/3900-2 carbon fiber-toughened epoxy system) were modified by grit-blasting, wet-peel ply (material), dry peel ply (material), and laser ablation patterning. Two different laser ablation patterns were utilized. Pattern A was a 0°/90° crosshatch while Pattern B was created to replicate that of a peel ply treated surface and consisted of an orthogonal rotation of linear arrays with line widths of 25 μm and linear arrays consisting of 15 lines with a line spacing of 200 μm. Each linear array, 0.3 cm in length and width, was oriented at 90° to the surrounding linear arrays. For laser ablation patterning, an Nd:YAG laser (=355 nm) with a beam size of 25 μm, a line spacing of 25 μm, and a scan speed of 25.4 cm/s was used. These patterns were transcribed into the surface using a single transcription step. Laser power and frequency were varied as indicated in Table 2. The surface energy was determined using water contact angle values (Table 2).

The treated composite surfaces were subsequently bonded with AF-555M adhesive (available commercially from the 3M Company) according to the manufacturer's specifications and the apparent shear strength was determined using a slight modification of ASTM D3165-00 regarding how the bonded test specimens were gripped (Table 2).

As seen in Table 2, laser ablation patterning dramatically reduced the water contact angle and increased the surface energy. Also, the apparent shear strength of the laser ablation patterned specimens is comparable, if not superior, to values obtained with other surface preparation techniques. This approach affords a rapid, scalable, highly precise, reproducible method for surface treatment of carbon fiber reinforced composites and eliminates contamination sources for bonded areas compared to peel-ply surface treatments.

TABLE 2

Characterization results for surface treatment of carbon fiber reinforced composite specimens as described in Example 4.

| Surface Treatment | Laser Power (W)/Frequency (kHz)/Pulse Energy (μJ) | Water Contact Angle (°) | Surface Energy (mJ/m$^2$) | Apparent Shear Strength (MPa) |
|---|---|---|---|---|
| Pristine | N/A | 79 | 25.8 | 23.9 ± 1.2 |
| Grit-Blasting | N/A | 86 | 20.8 | 25.1 ± 1.0 |
| Wet Peel Ply | N/A | 76 | 28.1 | 25.5 ± 0.7 |
| Dry Peel Ply | N/A | 83 | 22.9 | 26.7 ± 1.7 |
| Pattern A | 5.6/40/140 | 2 | 72.7 | 27.4 ± 1.3 |
| Pattern A | 5.6/60/93.3 | 14 | 70.6 | 27.6 ± 0.9 |
| Pattern A | 6.3/30$^a$/210 | 2 | 72.7 | 26.4 ± 0.6 |
| Pattern B | 5.6/40/140 | 26 | 65.6 | 26.7 ± 0.7 |

$^a$The crosshatch pattern line spacing was 50 μm.

Example 5

Generation of a Hydrophobic Carbon Fiber Reinforced Composite Surface

Carbon fiber reinforced composite specimens (16 plies of unidirectional Torayca P2302-19 prepreg, a T800H/3900-2 carbon fiber-toughened epoxy system) were modified via laser ablation patterning using Patterns A and B from Example 4 with the same laser ablation parameters except the laser power was 4.9 W operating at 60 kHz (resulting in a pulse energy of 81.7 μJ).

The surface energy was determined using water contact angle values. Pristine carbon fiber reinforced composite surfaces exhibited a water contact angle of 79° corresponding to a surface energy of 25.8 mJ/m$^2$. The laser ablation patterned surfaces exhibited water contact angles of 100° and 101° corresponding to surface energies of 12.4 mJ/m$^2$ and 11.9 mJ/m$^2$ for Patterns A and B, respectively.

Example 6

Generation of a Hydrophilic Polymer Surface

The surface of a polyphenylene material (Primospire PR250, Solvay Advanced polymers*) was modified by laser ablation patterning similar to Example 3 except the laser was operated at 5.6 W and 80 kHz (resulting in a pulse energy of 70 μJ). This ablation pattern created a square pillar array with pillar widths of 15 μm on the treated surface and an average feature height of 10 μm.

The surface energy was determined using water contact angle values. Pristine Primospire® PR250 exhibited a water contact angle of 87° corresponding to a surface energy of 20.1 mJ/m$^2$. The laser ablation patterned surface exhibited a water contact angle of 46° corresponding to a surface energy of 52.2 mJ/m$^2$.

Example 7

Generation of a Hydrophobic Polymer Surfaces

Kapton® HN polyimide film specimens (available commercially from DuPont de Nemours Co.) were modified by laser ablation patterning in a manner similar to Example 3 except the laser was operated at power settings and transcription steps as indicated in Table 3. This ablation pattern created a square pillar array with pillar widths of 25 μm and average feature heights as indicated in Table 3. The surface energy was determined using water contact angle values and is indicated in Table 3.

TABLE 3

Characterization results for surface treatment of Kapton ® HN specimens as described in Example 7.

| Laser Power (W)/Pulse Energy (μJ) | Number of Pattern Transcriptions | Water Contact Angle (°) | Surface Energy (mJ/m$^2$) | Surface Feature Height (μm) |
|---|---|---|---|---|
| Pristine Surface | | 81 | 24.3 | N/A |
| 4.9/61.3 | 1 | 83 | 22.9 | 1.4 |
| 4.9/61.3 | 2 | 82 | 23.6 | 2.2 |
| 4.9/61.3 | 4 | 92 | 16.9 | 4.1 |
| 5.1/63.8 | 1 | 83 | 22.9 | 3.5 |
| 5.1/63.8 | 2 | 91 | 17.6 | 4.4 |
| 5.1/63.8 | 4 | 98 | 13.5 | 12.5 |
| 5.3/66.3 | 1 | 85 | 21.5 | 5.9 |
| 5.3/66.3 | 2 | 89 | 18.8 | 6.5 |
| 5.3/66.3 | 4 | 108 | 8.7 | 8.5 |

Example 8

Generation of Hydrophobic Polymer Surfaces from Commercial Source Materials

Film specimens from several commercial sources including: APEC® 2097 (Bayer Materials Science, LLC), Teflon® (DuPont de Nemours Co.), and a crystalline PEEK film (Ajedium Films Croup, LLC.) were modified by laser ablation patterning in a manner similar to Example 3 except the laser was operated at power settings as indicated in Table 4. The surface energy was determined using water contact angle values and is indicated in Table 4.

TABLE 4

Characterization results for surface treatment of commercial materials as described in example 8.

| Material | Laser Power (W)/Pulse Energy (μJ) | Water Contact Angle (°) | Surface Energy (mJ/m$^2$) |
|---|---|---|---|
| APEC ® 2097 | Pristine Surface | 93 | 16.3 |
| APEC 2097 | 5.3/66.3 | 95 | 15.2 |
| APEC 2097 | 5.6/70 | 102 | 11.4 |
| Teflon ® | Pristine Surface | 109 | 8.3 |
| Teflon | 5.3/66.3 | 109 | 8.3 |
| Teflon | 5.6/70 | 120 | 4.5 |
| Teflon | 6.3/78.8 | 121 | 4.3 |
| PEEK | Pristine Surface | 85 | 21.5 |
| PEEK | 5.3/66.3 | 96 | 14.6 |
| PEEK | 5.6/70 | 88 | 19.5 |

Example 9

Generation of a Hydrophobic Copoly(Imide Siloxane) Surface

Copoly(imide siloxane) specimens were generated from the condensation reaction of an aromatic dianhydride (2,2-bis(3,4-dicarboxyphenyl)hexafluoropropane dianhydride, 6FDA) with a mixture of an aromatic diamine (4,4'-oxydianiline, 4,4'-ODA) and an amine-terminated polydimethyl siloxane (DMS-A21, Gelest, 10 wt. %). Reactions were carried out under nitrogen using a 1:1 ratio of dianhydride and diamine (20 wt. solids) in a 4:1 mixture of N-methylpyrrolidinone (NMP) and tetrahydrofuran (THF). The diamine was dissolved in NMP, to which a THF solution of DMS-A21 was added, followed by the dianhydride and additional NMP. The reaction mixture was mechanically stirred overnight. Films were cast on a Teflon® coated surface or polished stainless steel using a doctor's blade and placed in a forced air drying chamber until "tack-free." Films were then thermally imidized under nitrogen using a cure cycle with stages at 150, 175, 200, and 250° C.

Film specimens were modified by laser ablation patterning in a manner similar to Example 3 except the laser was operated at power and frequency settings as indicated in Table 5. This ablation pattern created a square pillar array with pillar widths and average feature heights indicated in Table 5. The surface energy was determined using water contact angle values and is indicated in Table 5.

Example 10

Generation of a Superhydrophobic Copoly (Imide Siloxane) Surface

Copoly (imide siloxane) specimens were generated from the same condensation reaction described in Example 9 except the aromatic dianhydride used was either 2,2-bis(3,4-dicarboxyphenyl) hexafluoropropane dianhydride, 6FDA, or 4,4'-oxydiphthalic anhydride, ODPA and the aromatic diamine was: 3,4'-oxydianiline, 3,4'-ODA; 4,4'-oxydianiline, 4,4'-ODA; 1,3-bis(3-aminophenoxy)benzene, 1,3-APB; or 2,2-bis[4-(4-aminophenoxy)phenyl]hexafluoropropane, 4-BDAF. Specific monomer combinations are indicated in Table 6. The DMS-A21 weight percent was also varied as indicated in Table 6. Film specimens were modified by laser ablation patterning in a manner similar to Example 3 except the laser was operated at 5.25 W (resulting in a pulse energy of 65.6 µJ).

The surface energy was determined using water contact angle values and is indicated in Table 6. Advancing and receding contact angle measurements and sliding angle measurements were made by tilting axis water contact angle measurements.

TABLE 6

Characterization results for surface treatment of various copoly(imide siloxane)s as described in Example 10.

| | | Pristine Surface | | | Laser Ablation Patterned Surface | | |
|---|---|---|---|---|---|---|---|
| Material Composition | DMS-A21 Content (wt. %) | $\theta_{adv}$ $(_{rec})$, ° | Surface Energy (mJ/m$^2$) | Sliding Angle | Surface Feature Height (µm) | $^{adv}$ $(_{rec})$, ° | Surface Energy (mJ/m$^2$) | Sliding Angle |
| 6FPA:4,4'-ODA | 5 | 112 (88) | 7.1 | 43 | 11.3 | 167 (140) | 0.01 | 10 |
| 6FDA:4,4'-ODA | 10 | 102 (80) | 11.4 | 31 | 16.5 | 163 (154) | 0.03 | 10 |
| 6FDA:4,4'-ODA | 20 | 113 (95) | 6.8 | >60 | 13.0 | 171 (164) | 0.002 | 2 |
| 6FDA:3,4'-ODA | 10 | 115 (90) | 6.1 | 27 | 18.3 | 170 (159) | 0.004 | 2 |
| 6FDA:1,3-APB | 10 | 110 (88) | 7.9 | >60 | 15.5 | 173 (146) | 0.001 | 15 |
| 6FDA:4-BDAF | 10 | 110 (95) | 7.9 | 29 | 4.8 | 169 (164) | 0.006 | 2 |
| ODPA:4,4'-ODA | 10 | 111 (97) | 7.5 | 37 | 19.3 | 175 (174) | 0.0002 | 1 |

TABLE 5

Characterization results for surface treatment of copoly(imide siloxane), 6FDA:4,4'-ODA:DMS-A21 (5 wt. %) as described in Example 9.

| Laser Power (W)/Pulse Energy (µJ) | Number of Pattern Transcriptions | Water Contact Angle (°) | Surface Energy (mJ/m$^2$) | Surface Feature Height (um) |
|---|---|---|---|---|
| Pristine Surface | 112 | 112 | 7.1 | N/A |
| 4.9/61.3 | 1 | 132 | 2.0 | 1.5 |
| 4.9/61.3 | 2 | 134 | 1.7 | 1.8 |
| 4.9/61.3 | 4 | 139 | 1.1 | 1.9 |
| 5.1/63.8 | 1 | 139 | 1.1 | 3.6 |
| 5.1/63.8 | 2 | 143 | 0.7 | 6.0 |
| 5.1/63.8 | 4 | 149 | 0.4 | 9.1 |
| 5.3/66.3 | 1 | 142 | 0.8 | 7.2 |
| 5.3/66.3 | 2 | 151 | 0.3 | 10.5 |

Example 11

Generation of a Superhydrophobic Copoly(Imide Butadiene) Surface

Copoly(imide butadiene) specimens were generated from the condensation reaction of an aromatic dianhydride (2,2-bis(3,4-dicarboxyphenyl)hexafluoropropane dianhydride, 6FDA) with a mixture of an aromatic diamine (1,3-bis(3-aminophenoxy)benzene, 1,3-APE) and an amine-terminated polybutadiene (generated by the reaction of hydroxyl-terminated polybutadiene with p-nitrobenzoyl chloride and the subsequent reduction of the nitro functionalities using tin chloride dihydrate). Reactions were carried out under nitrogen using a 1:1 ratio of dianhydride and diamine (20 wt. % solids) in a 4:1 mixture of N-methylpyrrolidinone (NMP) and toluene. The diamine was dissolved in NMP, to which a toluene solution of amine-terminated polybutadiene was added, followed by the dianhydride and additional NMP. The reaction mixture was mechanically stirred overnight. Films were cast on glass plates using a doctor's blade and placed in a forced air drying chamber until "tack-free." Films were then thermally imidized under nitrogen using a cure cycle with stages at 150, 175, 200, and 250° C. Film specimens were modified by laser ablation patterning in a manner similar to Example 10.

The surface energy was determined using water contact angle values. Pristine copoly(imide butadiene) exhibited a water contact angle of 83° corresponding to a surface energy of 22.9 mJ/m$^2$. The laser ablation patterned surface exhibited a water contact angle of 175° corresponding to a surface energy of 0.0003 mJ/m$^2$. The surface also exhibited a contact angle hysteresis of 9.5° and a sliding angle of 3°.

Example 12

Generation of a Superhydrophobic Copoly(Imide Butadiene Acrylonitrile) Surface

Copoly(imide butadiene acrylonitrile) specimens were generated from the condensation reaction of an aromatic dianhydride (2,2-bis(3,4-dicarboxyphenyl)hexafluoropropane dianhydride, 6FDA) with a mixture of an aromatic diamine (3,4'-oxydianiline, 3,4'-ODA) and an amine-terminated copoly(butadiene acrylonitrile) (Polysciences Inc., Product No, 09753). Reactions were carried out under nitrogen using a 1:1 ratio of dianhydride and diamine (20 wt. % solids) in a 4:1 mixture of N-methylpyrrolidinone (NMP) and toluene. The diamine was dissolved in NMP, to which a toluene solution of amine-terminated copoly(butadiene acrylonitrile) was added, followed by the dianhydride and additional NMP. The reaction mixture was mechanically stirred overnight. Films were cast on glass plates using a doctor's blade and placed in a forced air drying chamber until "tack-free." Films were then thermally imidized under nitrogen using a cure cycle with stages at 150, 175, 200, and 250° C. Film specimens were modified by laser ablation patterning in a manner similar to Example 10.

The surface energy was determined using water contact angle values. Pristine copoly(imide butadiene acrylonitrile) exhibited a water contact angle of 86° corresponding to a surface energy of 20.8 mJ/m$^2$. The laser ablation patterned surface exhibited a water contact angle of 173° corresponding to a surface energy of 0.001 mJ/m$^2$. The surface also exhibited a contact angle hysteresis of 20.8° and a sliding angle of 7°.

The examples provided herein serve to demonstrate the nature of this invention, which is a method to controllably modify the surface energy of a variety of materials by the generation of topographical patterns of specific dimensional sizes and geometric shapes via direct laser ablation. The examples demonstrate that depending on the laser parameters utilized, hydrophilic materials can be rendered more hydrophilic, hydrophobic or superhydrophobic, and hydrophobic materials can be modified to exhibit hydrophilic, more hydrophobic or superhydrophobic surface properties. The laser ablation patterning method is rapid, scalable, environmentally benign, precise, and can be performed on a wide variety of materials. The resultant surfaces can be utilized for adhesive bonding, self-cleaning, particle adhesion mitigation, low friction surfaces, and anti-icing surfaces to name a few.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of adhesively bonding a first surface to a second surface, comprising the steps of:
    providing a substrate comprising substrate material defining an ablation threshold;
    determining a topographical pattern including areas from which material is to be removed;
    directly laser treating selected portions of a completely uncovered first surface of said substrate corresponding to the areas using at least one beam of energy having sufficient energy to supersede said ablation threshold of said substrate material to form a laser surface treated area comprising the predefined topographical pattern at said first surface, said at least one beam of energy having a width of approximately 25 micrometers and an energy of approximately 1-500 microJoules, wherein features in said predefined topographical pattern have a width of approximately 1-500 micrometers and a height of approximately 1.4-100 micrometers;
    utilizing adhesive to adhesively bond said laser surface treated area of said first surface to a second surface.

2. The method of claim 1, wherein said substrate is selected from the group consisting of metals, metal alloys, ceramics, polymers, fiber-reinforced composites thereof, and combinations thereof.

3. The method of claim 1, wherein said substrate comprises a metal alloy selected from the group consisting of titanium alloys and aluminum alloys.

4. The method of claim 1, wherein said substrate comprises a polymer material selected from the group consisting of polyimide, copoly(imide siloxane), copoly(imide butadiene), copoly(imide butadiene acrylonitrile), polycarbonate, poly (arylene ether), fluoropolymer, epoxy resins and polyphenylene.

5. The method of claim 1, wherein said substrate comprises a carbon fiber-reinforced epoxy matrix composite material.

6. The method of claim 1, wherein the ablating step further comprises the step of controlling parameters consisting of beam size, laser power, laser frequency, scan speed, number of pattern iterations, and combinations thereof.

7. The method of claim 1, wherein said surface treated area of said first surface is coated with at least one of a primer and a coupling agent prior to adhesively bonding said surface treated area of said first surface to a second surface.

8. The method of claim 1, wherein said at least one beam of energy comprises a laser beam.

9. The method of claim 8, wherein said laser beam is pulsed.

10. The method of claim 8, wherein said laser beam is continuous.

11. A method of adhesively bonding a first surface to a second surface, comprising the steps of:
    providing a substrate comprising a substrate material defining an ablation threshold;
    determining a topographical pattern including areas from which material is to be removed;
    utilizing at least one laser beam of energy having sufficient energy to supersede said ablation threshold of said substrate material to directly laser surface treat areas of an uncovered substrate corresponding to the areas to form a laser surface treated area comprising the predefined topographical pattern at said first surface, said at least one laser having a width of approximately 25 micrometers and an energy of approximately 1-200 microJoules, wherein features in said topographical pattern have a width of approximately 10-250 micrometers and a height of approximately 1.4-50 micrometers, and wherein said substrate is selected from the group consisting of metals, metal alloys, ceramics, polymers, fiber-reinforced composites thereof, and combinations thereof;

utilizing adhesive to adhesively bond said laser surface treated area of said first surface to a second surface.

12. The method of claim 11, wherein said surface treated area of said first surface is coated with at least one of a primer and a coupling agent prior to adhesively bonding said surface treated area of said first surface to a second surface.

13. The method of claim 11, wherein the ablating step further comprises the step of controlling parameters selected from the group consisting of beam size, laser power, laser frequency, scan speed, number of pattern iterations, and combinations thereof.

14. A method of adhesively bonding a first surface to a second surface, the method comprising:

providing a substrate comprising a substrate material defining an ablation threshold;

determining a pattern that includes predefined areas from which material is to be removed;

utilizing at least one laser beam having sufficient energy to supersede said ablation threshold of said substrate material to directly laser surface treat selected portions of an uncovered first surface of said substrate corresponding to the predefined areas to form a laser surface treated area comprising a predefined topographical pattern at said first surface, said at least one laser beam having a width of approximately 25 micrometers and an energy of approximately 3-175 microJoules, wherein features in said topographical pattern have a width of approximately 15-100 micrometers and a height of approximately 10-30 micrometers;

utilizing adhesive to adhesively bond said laser surface treated area of said first surface to a second surface.

15. The method of claim 14, wherein said surface treated area of said first surface is coated with at least one of a primer and a coupling agent prior to adhesively bonding said surface treated area of said first surface to a second surface.

16. A method of reducing the surface energy of a substrate to promote abhesion the method comprising:

providing a substrate comprising a substrate material defining an ablation threshold, said substrate having a surface defining a first surface energy;

transcribing a predefined pattern onto said surface of said substrate to form a treated surface by directly ablating said surface of said substrate using at least one beam of energy having sufficient energy to supersede said ablation threshold of said substrate material to form a predefined topographical pattern at said treated surface, said at least one beam of energy having a width of approximately 25 micrometers and an energy of approximately 1-500 microJoules, wherein said treated surface has a surface defining a second surface energy that is significantly lower than said first surface energy.

17. The method of claim 16, wherein:

features in said predefined topographical pattern have a width of approximately 1-500 micrometers and a height of approximately 1.4-100 micrometers.

18. The method of claim 17, wherein the topographical pattern comprises a crosshatch pattern having a plurality of pillars defining gaps therebetween.

19. The method of claim 18, wherein the topographical pattern comprises a 0°/90° crosshatch pattern.

* * * * *